United States Patent [19]

Stafford

[11] E Patent Number: Re. 33,344

[45] Reissued Date of Patent: Sep. 18, 1990

[54] APPARATUS AND METHOD FOR DETECTING NEGATIVE IONS

[75] Inventor: George C. Stafford, San Jose, Calif.

[73] Assignee: Finnigan Corporation, San Jose, Calif.

[21] Appl. No.: 813,880

[22] Filed: Dec. 24, 1985

Related U.S. Patent Documents

Reissue of:

[64] Patent No.: 4,423,324
Issued: Dec. 27, 1983
Appl. No.: 59,,961
Filed: Jul. 23, 1979

U.S. Applications:

[63] Continuation of Ser. No. 897,150, Apr. 18, 1978, abandoned.

[51] Int. Cl.[5] ..... H01J 43/00; H01J 49/02

[52] U.S. Cl. ..... 250/281; 250/282; 250/283; 250/299; 313/103 R; 328/243

[58] Field of Search ..... 250/281, 282, 283, 299, 250/300; 313/103 R; 328/243; 329/148

[56] References Cited

U.S. PATENT DOCUMENTS

| | | | |
|---|---|---|---|
| 2,213,140 | 8/1940 | Kallmann et al. | 250/281 |
| 2,816,243 | 12/1957 | Herb et al. | 313/63 |
| 3,136,908 | 6/1964 | Weinman | 250/423 |
| 3,573,454 | 4/1971 | Andersen et al. | 250/41.9 |
| 3,660,655 | 5/1972 | Wardell | 250/427 |
| 3,730,696 | 5/1973 | Pointu et al. | 65/30 |
| 3,774,028 | 11/1973 | Daly | 250/299 |
| 3,786,359 | 1/1974 | King | 328/233 |
| 3,898,456 | 8/1975 | Dietz | 250/283 |
| 4,037,100 | 7/1977 | Purser | 250/281 |
| 4,066,894 | 1/1978 | Hunt et al. | 250/282 |
| 4,093,855 | 6/1978 | Fite et al. | 250/282 |
| 4,267,448 | 5/1981 | Feser et al. | 250/281 |

OTHER PUBLICATIONS

Large Aperture Detector by Gibbs & Cummins Rev. Sci. Inst. vol. 37, No. 10, Oct. 1966, pp. 1385–1390.
Secondary Positive Ion . . . by Bradley Jour. Applied Physics vol. 30, No. 1, Jan. 1959, pp. 1–8.
Larsen et al., Int. J. Mass Spectrometry and Ion Physics, vol. 11, pp. 149–155 (1973).
Anderson, J. Mass Spectrometry and Ion Physics, vol. 2 (1969), pp. 61–74.
Andersen, J. Mass Spectrometry and Ion Physics, vol. 3 (1970), pp. 413–428.
Andersen et al., Science, Feb. 1972, pp. 853–860.
Andersen, Microprobe Analysis, pp. 531–553.
Benninghoven et al., Physics Letters, vol. 40A, No. 2, Jul. 2, 1972, pp. 169–170.
Baumgartner et al., J. Physics E: Scientific Instruments, vol. 9, 1976, pp. 321–329.
Goodings et al., Int. J. Mass Spectrometers and Ion Physics, vol. 9, 1972, pp. 417–420.
La Lau, Advances in Analytic Chemistry and Instrumentation, vol. 8, 1970, pp. 93–120.
Gibbs et al., Review of Scientific Instruments, vol. 37, No. 10, Oct. 1966, pp. 1385–1390.
Bradley, Jour. Applied Physics, vol. 30, No. 1, Jan. 1959, pp. 1–8.
Ridley, Nuclear Instruments and Methods, vol. 14, 1961, pp. 231–236.

*Primary Examiner*—Jack I. Berman
*Attorney, Agent, or Firm*—Flehr, Hohbach, Test, Albritton & Herbert

[57] ABSTRACT

[A negative ion detector converts negative ions to positive ions by means of a conversion anode which is maintained at a relatively high positive voltage. The resultant positive ions are detected by a standard continuous dynode electron multiplier which has its detection signal output at ground potential.] *Apparatus for detecting the abundance of negative ions from a source of negative ions, having a first conversion dynode and an electron multiplier, the electron multiplier having a second conversion dynode. The first conversion dynode is operated at a high positive potential to attract the negative ions whereby the negative ions impact the first conversion dynode with a substantial portion of the negative ions being converted to secondary positive ions. The second conversion dynode is operated at a potential which is less positive than the positive potential on the first conversion dynode to attract the secondary positive ions and to cause the secondary positive ions to be converted to electrons which are multiplied in the electron multiplier to provide an output signal indicative of the abundance of negative ions emanating from the source.*

22 Claims, 2 Drawing Sheets

APPARATUS AND METHOD FOR DETECTING NEGATIVE IONS

Matter enclosed in heavy brackets [ ] appears in the original patent but forms no part of this reissue specification; matter printed in italics indicates the additions made by reissue.

RELATED APPLICATIONS

This application is a continuation of my copending application Ser. No. 897,150, filed Apr. 18, 1978, entitled "Apparatus for Detecting Negative Ions", now abandoned, which was a continuation-in-part of application Ser. No. 790,148, filed Apr. 22, 1977, entitled "Apparatus for Detecting Negative Ions", now abandoned.

BACKGROUND OF THE INVENTION

The present invention is directed to apparatus for detecting negative ions and more particularly to apparatus where the negative ions are produced by a quadrupole mass spectrometer.

In mass spectrometers and other devices which generate ions, both positive and negative ions are produced. With the new high pressure ionization techniques positive and negative ions are produced in abundance. The chemical composition of the compound under investigation ultimately determines the relative intensity of positive and negative ions. Thus it is analytically useful to detect both polarities of ions.

To detect positive ions a standard continuous dynode electron multiplier (CDEM) is shown in FIG. 1A which is available under the trademark GALILEO as model 4770. The cathode has a voltage of −1 kv to −3 kv impressed upon it. This high voltage accelerates the positive ions into its first stage. The anode end is grounded and the detection signal is obtained at ground potential.

FIG. 1B illustrates a typical negative ion detector of the same configuration as FIG. 1A except that the cathode is operated at approximately +2 kv voltage to attract the negative ions. The output signal at the anode is floated at a relatively high positive voltage from +3 kv to +5 kv.

While the positive ion detector configuration of FIG. 1A is satisfactory the negative ion detector as illustrated in FIG. 1B has several disadvantages:

1. The anode portion where the signal is detected is at a high potential relative to ground requiring an off grounded preamplifier and complex preamplifier circuitry.

2. Since the negative ion detector as shown in FIG. 1B is necessarily a floating system it will be sensitive to stray electrons in the system. Also background noise will be high.

3. Since the output signal lead is at a relatively high positive potential microphonic noise will be severe.

On the other hand, since the positive ion detector of FIG. 1A has its signal output at ground potential it does not suffer these disadvantages and therefore is satisfactory.

OBJECT AND SUMMARY OF THE INVENTION

It is, therefore, a general object of this invention to provide an improved negative ion detector.

In accordance with the above object there is provided apparatus for detecting negative ions from a source of negative ions. Conversion means are provided for receiving the negative ions and producing a proportional amount of positive ions. The resultant positive ions are then detected.

DETAILED DESCRIPTION OF THE PREFERRED EMBODIMENT

Figure 2:
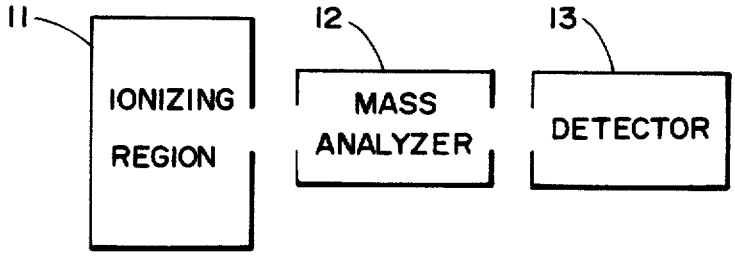
FIG. 2 is a block diagram of a mass spectrometer system embodying the present invention.

FIG. 2 illustrates a typical system in which the negative ion detector of the present invention is used. An ionizing region 11 produces negative ions and other particles including electrons, positive ions, and neutrals which are analyzed in the mass analyzer 12 which may be of the quadrupole filter type. A detector 13 senses the desired particle to indicate its abundance or amount.

Figure 1A:
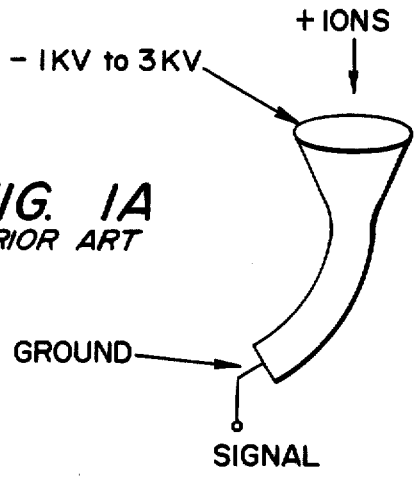
FIG. 1A PRIOR ART
FIGS. 1A and 1B are simplified diagrams of typical prior art ion CDEM detectors.
Figure 1B:
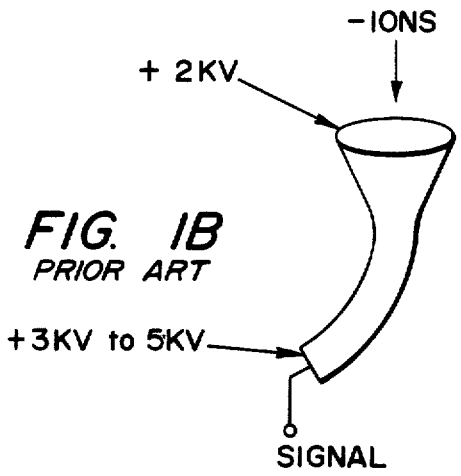
FIG. 1B PRIOR ART
Figure 3:
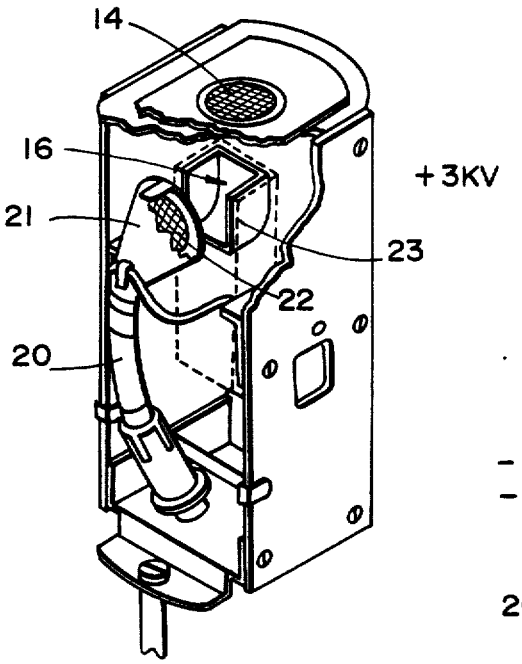
FIG. 3 is a cut away perspective view of the detector portion of FIG. 2.

In accordance with the invention the configuration of detector 13 is illustrated in FIG. 3 and is suitable for detecting negative ions. A gridded aperture screen 14 receives negative ions from mass analyzer 12 which bombard a conversion unit or anode 16 which converts the negative ions to positive ions. This conversion anode may be constructed entirely of any one of the metals Al, Cu, Ag, Cr, Be, and stainless steel and in addition oxides of these metals. In the preferred embodiment anode 16 is oxidized copper in the form of a cube with two adjacent sides open. Alternatively a tilted flat surface or venetian blind could be used. Such unit forms an effective reflector for receiving the negative ions through aperture screen 14 and directing the resultant positive ions to a continuous dynode electron multiplier 20. Multiplier 20 is identical to FIG. 1A and includes a horn portion 21 with an incoming aperture screen 22 attached. Screen 22 prevents the escape of secondary electrons from the horn portion.

Conversion anode 16 is supported by rectangularly shaped unit 23 shown in dashed outline. Anode 16 is maintained at a +3 kv voltage in order to attract the negative ions from mass analyzer 12. This voltage is not critical.

Figure 4:
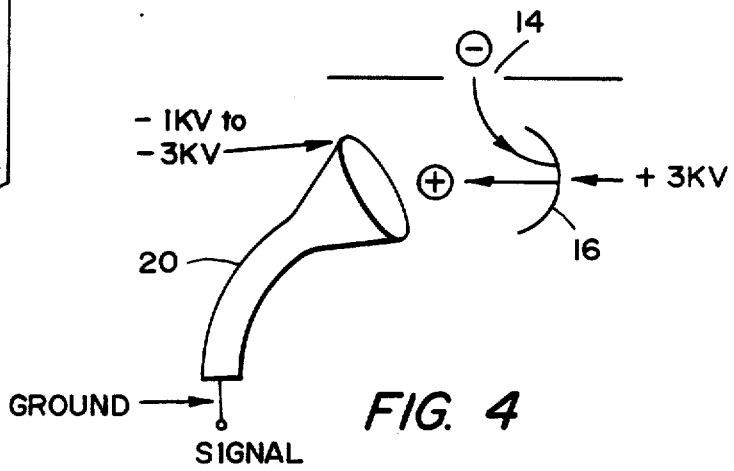
FIG. 4 is a conceptual diagram of FIG. 3.

FIG. 4 shows FIG. 3 in conceptual form where a negative ion enters through aperture screen 14 and impacts conversion anode 16 to produce a proportional amount of positive ions the amount being dependent on ion structure such as mass or other characteristics. The positive ions are then detected by electron multiplier 20. From a theoretical point of view the conversion of negative ions to positive ions is accomplished by impacting the primary negative ions onto or accelerating them towards the surface of the conversion anode 16. Stray electrons impacting on the anode surface do not produce positive ions and are not detected.

Three major mechanisms are believed to be responsible singly or in combination for this negative ion to positive ion conversion process.

1. Sputtering

Metal atoms or absorbed molecules are vaporized off the surface of the conversion anode by the energetic bombarding negative ions. A fraction of these vaporized atoms lose electrons to become positive ions which will subsequently be collected by the positive ion electron multiplier.

2. Fragmentation of the Negative Ions

When the high energy (~3 kv) primary negative ions bombard the metal surface, they may undergo extensive fragmentation. These fragments consist of neutral species, positive ions, and negative ions. Only the position ion fragments will be collected at the positive ion electron multiplier and produce an output signal.

3. Charge Stripping

When the negative ions are accelerated toward or impact the conversion anodes they may lose two electrons to become a positive ion of the same elemental composition.

Thus an improved negative ion detector is provided.

Figure 5:
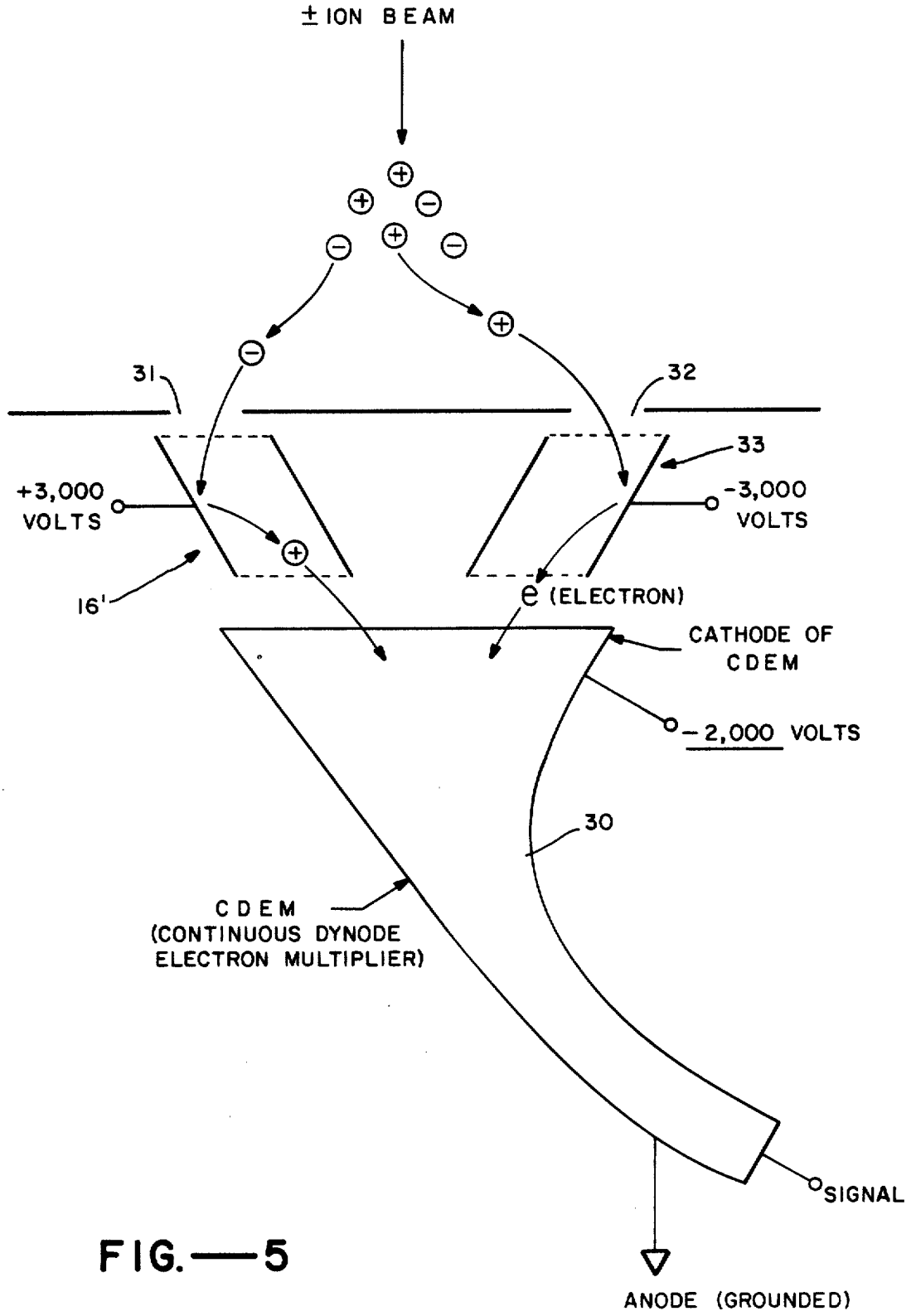
FIG. 5 is an alternative embodiment in conceptual form similar to FIG. 4.

The present invention is also adaptable to detect positive and negative ions simultaneously. One system to accomplish this is described in U.S. Pat. No. 4,066,894 entitled "Positive and Negative Ion Recording System For Mass Spectrometer" with Donald F. Hunt and the present inventor as coinventors. That patent discloses two continuous dynode electron multipliers (CDEM); one for positive ions and one for negative ions. In accordance with the invention FIG. 5 illustrates apparatus for substantially concurrently detecting negative and positive ions from the output of the mass analyzer 12 (FIG. 2) using a common CDEM 30. Such multiplier is similar to that showon in FIG. 4 in that its cathode is at a relatively negative voltage of, for example, 2,000 volts and its anode is grounded. Thus, the signal output is taken at ground or is referenced to ground potential. The advantages of such grounded signal are, of course, explained above. Thus the CDEM 30 is suitable for determining the abundance of positive ions.

As indicated in FIG. 5 and also corresponding to FIG. 4, negative ions from the ion beam which are of necessarily low energy (for example, less than 100 electron volts since they are produced by a quadrupole type mass analyzer) are attracted through an aperture 31 by a conversion unit 16'. This unit is similar to unit 16 in FIG. 4 and is maintained at a +3,000 volts for example. As described above, the conversion unit in response to the bombardment of negative ions produces a proportional amount of positive ions which are sensed by detector 30.

In addition to the facility of processing low level ions the present invention operates at high conversion efficiencies of approximately 100% with organic (or in a broader sense polyatomic) ions.

The positive ions in the ion beam are directed toward the multiplier 30 through the aperture 32 by the surface or plate 33 which is maintained at a relatively negative potential of −3,000 volts. Plate means 33 is in essence the first stage of the multiplier 30. In accordance with well-known theory, the positive ions hitting plate 33 (which may be of, for example, copper-beryllium) produces electrons as indicated which are sensed by multiplier 30. The electrons, of course, are produced by the well-known mode of secondary electron emission. And moreover, in accordance with this mode the number of electrons produced are proportional to the abundance of positive ions impacting or hitting plate means 33. Thus the output signal is proportional to the input of positive and negative ions.

From a practical standpoint although the positive and negative ions of the ion beam are present substantially concurrently, the output signal can be time multiplexed to produce a signal sequentially proportional to positive and then negative ions. As disclosed in the above Hunt-Stafford patent the quadrupole mass analyzer can be sequenced by a controller unit to alternately transmit positive and negative ions at a frequency, for example, of 1 kHz. Thus, the 1 kHz sequencing of the quadrupole can be applied to time multiplex the output signal of multiplier 30. Such frequency is not critical and may range from typically 1 Hz to 100 kHz.

Although multiplier 30 is shown as a continuous unit this could be in the form of several discrete stages; for example, 15 stages where the sixteenth stage would be unit 33. This is known as a box and grid type multiplier. Moreover although a plate means 33 is illustrated in FIG. 5 it is apparent that this is merely for spatial considerations and with other geometries a unit such as this could be eliminated with the positive ions directly proceeding into a common detector unit 30.

Thus, an improved system for detecting negative and positive ions either sequentially or simultaneously has been provided.

What is claimed is:

1. Apparatus for detecting the abundance of negative ions from a source of such ions comprising: conversion means maintained at a high positive voltage for attracting and accelerating only said negative ions whereby the negative ions impact the conversion means with sufficient kinetic energy to produce a proportional amount of secondary positive ions, and electron multiplier means having an input operated at a negative potential to attract said secondary positive ions and for providing an output signal indicative of the abundance of said negative ions.

2. Apparatus as in claim 1 wherein said *high* positive voltage is in the order of magnitude of 2000 volts.

3. Apparatus as in claim 1 where said output signal is referenced to ground potential.

4. In a mass spectrometer of the type in which both positive and negative ions are produced, mass analyzed and applied to detection means to provide output detection signals indicative of the composition of a chemical compound, the improvement comprising a [signal] *single* electron multiplier means including a first stage operated at *a* negative potential to attract positive ions and provide an output signal indicative of the abundance of said positive ions and *conversion dynode* means for receiving the negative ions and converting them to secondary positive ions and whereby said secondary positive ions are attracted to said electron multiplier means to provide an output signal indicative of the abundance of said negative ions whereby a single [detection] *electron multiplier* means serves to provide output signals indicative of the abundance of negative or positive ions.

5. A mass spectrometer as in claim 4 wherein said electron multiplier means provides output signals referenced to ground potential.

6. A mass spectrometer system comprising: an ionizing region where a chemical composition to be analyzed is ionized to form positive and negative ions, a mass analyzer disposed to receive and analyze at least said negative ions; *conversion dynode* means for converting said negative ions from said analyzer to secondary positive ions, and electron multiplier means having an input operated at a negative potential to attract said secondary positive ions from said conversion means and provide an output signal with respect to ground potential indicative of the abundance of said negative ions.

7. Apparatus as in claim 6 where said negative ions are polyatomic and said amount of secondary positive ions for polyatomic ions is substantially 100% of said negative ions.

*8. Apparatus for detecting the abundance of negative ions from a source of such ions comprising: conversion dynode means maintained at a high positive voltage for attracting and accelerating only said negative ions whereby the negative ions impact the conversion dynode means with sufficient kinetic energy to produce a substantially proportional amount of secondary positive ions, and electron multiplier means having an input operated at a potential to attract said secondary positive ions and for providing an output signal indicative of the abundance of said negative ions.*

*9. Apparatus as in claim 8 wherein said high positive voltage is in the order of magnitude of 3000 volts.*

*10. Apparatus as in claim 8 where said output signal is referenced to ground potential.*

*11. In a mass spectrometer of the type in which both positive and negative ions are produced, mass analyzed and applied to detection means to provide output detection signals indicative of the composition of a chemical compound, the improvement comprising a single electron multiplier means including a first stage operated at a potential to attract positive ions and provide an output signal indicative of the abundance of said positive ions and conversion dynode means operated at a positive potential substantially more positive than the potential on the first stage of the electron multiplier means for receiving the negative ions and converting them to secondary positive ions and whereby said secondary positive ions are attracted to said electron multiplier means to provide an output signal indicative of the abundance of said negative ions whereby said single electron multiplier means serves to provide output signals indicative of the abundance of negative and positive ions.*

*12. A mass spectrometer as in claim 11 wherein said electron multiplier means provides output signals referenced to ground potential.*

*13. A mass spectrometer system comprising: an ionizing region where a chemical composition to be analyzed is ionized to form positive and negative ions, a mass analyzer disposed to receive and analyze at least said negative ions; conversion dynode means operated at a high positive potential for converting said negative ions from said analyzer to secondary positive ions, and electron multiplier means having an input operated at a potential which is less positive than the potential on said conversion dynode means to attract said secondary positive ions from said conversion dynode means and provide an output signal with respect to ground potential indicative of the abundance of said negative ions.*

*14. Apparatus as in claim 13 where said negative ions are polyatomic and said amount of secondary positive ions for polyatomic ions is a high proportion of said negative ions.*

*15. In an apparatus for detecting the abundance of negative ions from a source of negative ions, a first conversion dynode operated at a high positive potential for attracting the negative ions from said source of negative ions and causing a substantial portion of the negative ions impacting said first conversion dynode to be converted into secondary positive ions, electron multiplier means including a second conversion dynode operated at a potential which is less positive than the potential on the first conversion dynode for attracting the secondary positive ions created at said first conversion dynode and converting the secondary positive ions to electrons, said electron multiplier means multiplying the electrons emitted from the second conversion dynode to provide an output signal indicative of the abundance of negative ions emanating from the source.*

*16. Apparatus as in claim 15 together with means for causing said output signal to be referenced to ground potential.*

*17. Apparatus as in claim 15 wherein said second conversion dynode is operated at a potential which is negative with respect to ground potential.*

*18. Apparatus as in claim 15 wherein said electron multiplier means is a continuous dynode electron multiplier.*

*19. Apparatus as in claim 15 wherein said electron multiplier means is comprised of a multiplicity of discrete dynode stages.*

*20. In a method for detecting the abundance of negative ions from a source of negative ions, attracting the negative ions with a high positive potential converting a substantial portion of the negative ions to secondary positive ions, attracting the secondary positive ions and converting the secondary positive ions to electrons, and multiplying the electrons to provide an output signal indicative of the abundance of negative ions emanating from said source.*

*21. A method as in claim 20 wherein in the output signal is referenced to ground potential.*

*22. A method as in claim 20 wherein the second conversion dynode is operated at a potential which is negative with respect to ground potential.*

* * * * *